1

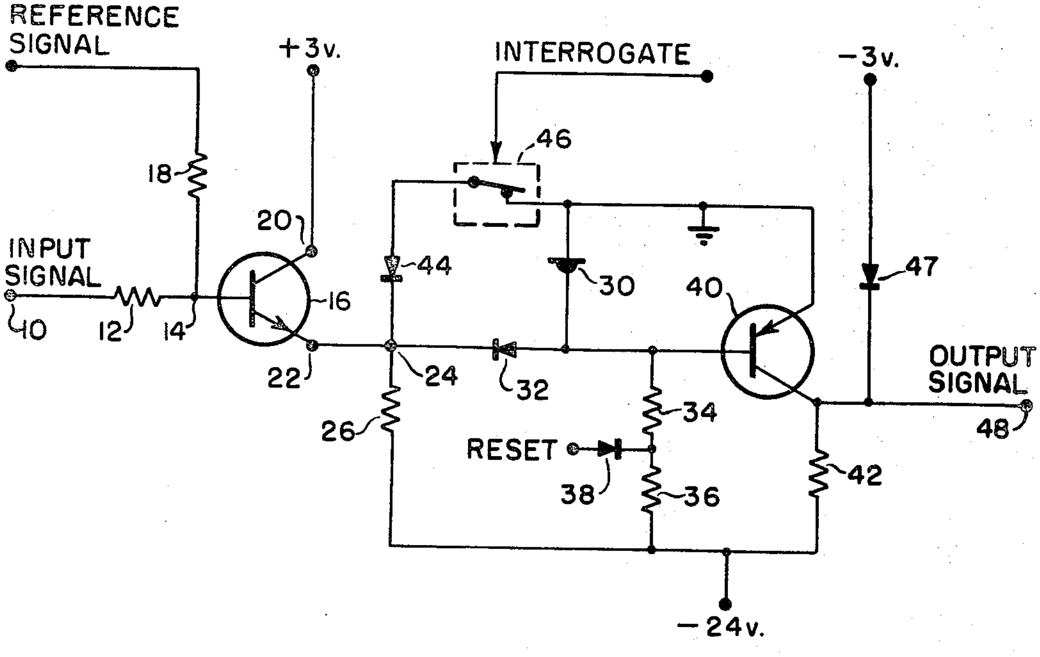
INVENTOR
PAUL G. LUCAS
BY Kenway Jenney & Hildreth
ATTORNEYS

3,406,297

POLARITY RESPONSIVE COMPARATOR CIRCUIT FOR SIMULTANEOUS ANALOG-DIGITAL CONVERTERS USING A TUNNEL DIODE

Paul G. Lucas, Magnolia, Mass., assignor to Adage, Inc., Cambridge, Mass., a corporation of Massachusetts Filed Dec. 23, 1964, Ser. No. 424,167
5 Claims. (Cl. 307—235)

My invention relates to an improved comparator circuit. More particularly it relates to a low cost comparator circuit which utilizes the state of conduction of a tunnel diode as an indication of the polarity of the input signal supplied thereto.

Comparators are used principally in analog to digital converters to provide an indication of the polarity of the signal supplied thereto. In analog to digital converters of the feedback type, a single comparator is usually provided. This comparator is used to compare the polarity of the difference between the input analog signal which is to be converted and a second analog signal whose amplitude is proportional to the number then stored in the digital register. If this difference signal has a first polarity, then the count in the digital storage register may be changed. If the signal has the opposite polarity, the comparator signal will indicate that other steps should be taken in the analog to digital converter program. Analog to digital converters of the "programmed feedback" type are generally discussed in United States Patent No. 3,052,880, dated Sept. 4, 1962, to Young et al., which is assigned to the assignee of the present invention. In analog to digital converters of this type, since only a single comparator is used the cost of the comparator is not a significant element in the overall cost of the device, accuracy, speed and reliability being major considerations.

However, with the increasing speed capability of modern data processing equipment, there has developed a need in recent years for very high speed analog to digital converters. The conventional analog to digital converters of the programmed feedback type have not in general been sufficiently fast to meet these high speed requirements.

One type of analog to digital converter which is inherently very fast is the so-called "simultaneous" converter. In this device, if the signal is to be represented by "$n$" binary bits, then it is supplied simultaneously to $2^n-1$ comparators. Each comparator is also supplied with an appropriate reference signal and conversion of the signal into a signal indicative of $2^n$ levels takes place simultaneously upon receipt by the comparators of an interrogation signal. This output signal from the comparators may then be coded to give the desired binary indication. A system of this type is described, in general terms, at pages 2 and 3 and 28 to 30 of the "Analog-Digital Conversion Handbook" No. E5100, published in 1964 by Digital Equipment Corporation, Maynard, Mass.

As noted above, if the signal value is to be represented by $n$ binary bits, $2^n-1$ comparators are required. Thus for a three bit digital signal, seven comparators are required and for a four bit signal, fifteen. The speed of such converters make them highly desirable for many modern applications, but the cost of providing the many comparators required, even for relatively low resolution, i.e., few bits, has limited the extent to which this conversion method has been used.

2

I have invented a novel comparator circuit of relatively low cost for use in simultaneous converters of this type which, in addition to its economy of construction provides accurate and reliable operation and which may also be interrogated and reset without the use of complex or involved circuitry. Accordingly, it is a principal object of my invention to provide an improved comparator circuit for use in analog to digital converters. Another object of my invention is to provide a comparator of relatively low cost that may advantageously be used in large numbers in analog to digital converters of the simultaneous type.

A further object of my invention is to provide a comparator circuit of the type described which is relatively simple in construction, and yet accurate and reliable in operation.

A feature of my invention is the use of the "state" of a tunnel diode to provide an output indication from the comparator.

Other and further objects and features of my invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of my invention, reference should be had to the following detailed description taken in connection with the accompanying drawing, in which the single figure is a schematic diagram of a comparator circuit which embodies my invention.

As shown in the drawing, the input signal is supplied to the input terminal 10 of the circuit. A resistor 12 is connected between the input terminal 10 and the base terminal 14 of an NPN transistor 16. The reference signal for the comparator is also supplied to the base terminal 14 of the transistor 16 through resistor 18. The collector terminal 20 of the transistor 16 is connected to a positive source of potential, here indicated as being 3 volts for illustrative purposes. The emitter terminal 22 of transistor 16 is connected directly to the junction point 24. A resistor 26 connects the junction point 24 to a source of negative potential, here shown as —24 volts for illustrative purposes.

Two other circuits are connected from the junction 24 to ground, the "indicating" and the "interrogate" circuit. The indicating circuit includes the tunnel diode 30 and a conventional diode 32 connected in series in the manner shown between a source of reference potential, here ground, and the junction point 24. The reset circuit includes the resistors 34 and 36 connected from the cathode of the tunnel diode to the —24 volt power supply and the diode 38. The reset pulse, a short pulse of approximately +3 volts amplitude is applied to the anode of the diode 38 to reset the circuit after use as will be described in greater detail below. The transistor 40, a PNP type, is connected as shown with the emitter and base in parallel with the tunnel diode and the collector connected to the —24 volt supply through a resistor 42. The output signal of the circuit, which is either a negative voltage or a 0 voltage, is taken from the junction of the collector of transistor 40 and resistor 42 and appears on terminal 46. Terminal 48 is clamped to approximately —3 volts by the diode 47 which is connected between a —3 volt supply and the terminal 48.

The "interrogate" circuit consists merely of a diode 44 connected in series with a switch 46, the combination connected between the junction 24 and ground. The switch may be any type of switch including relay contacts, known diode or transistor switches. Since the type of switch will depend upon the circuit application, no specific type is illustrated although in practice, I have found a transistor switch provides satisfactory operation. The switch 46 is normally closed, but opens in response to an "interrogate" command supplied to it, usually from an internal clock in the analog to digital converter.

To understood the operation of the circuit illustrated it is necessary to understand that as the current through a tunnel diode is increased from zero in the forward direction, the voltage across the diode will also increase, up to a certain relatively small value, e.g., of the order of 50 millivolts. This is called the low voltage region of operation. If the current is increased beyond this value, even slightly, the voltage across the diode will suddenly jump to a relatively high value, e.g., of the order of 700 millivolts or more. This is called the high voltage region of operation. The significant fact is that there exists a value of the current passing through the diode which, if exceeded, will cause the diode to transfer from the low to the high voltage region of its operation and that there is a substantial difference between these voltages.

To insure that the illustrated circuit is in a condition to make a comparison when called upon to do so, the circuit (and others like it in simultaneous converters) is reset by applying a positive pulse of approximately 3 volts magnitude to the anode of diode 38. This pulse, while it continues, clamps the junction of resistors 34 and 36 to about +2.5 volts. This positive voltage reverse biases the tunnel diode 30, thus insuring that when the pulse is removed, the tunnel diode will be in the low voltage region of its operating characteristic, the combined values of resistors 34 and 36 being sufficiently large to prevent a current through the tunnel diode large enough to trigger it into the high voltage region. When the tunnel diode is in the low voltage region of its operation, the voltage appearing on the base of transistor 40 is insufficient to cause the transistor to conduct. The output signal is therefore clamped at —3 volts by the diode 47.

As noted above, the switch 46 is normally closed, except when it is desired to interrogate the circuit. Accordingly, the junction 24 is normally clamped at slightly below ground potential. Under these conditions, if the difference between the input and reference signals is negative, transistor 16 cannot conduct because the base-emitter diode will be reverse biased. If this difference signal is positive, then transistor 16 will conduct, current flowing from the emitter through resistor 26.

When an interrogate signal is received, the switch 46 opens, removing the ground potential clamp from junction 24. If transistor 16 was conducting before the clamp was removed because the signal on the base terminal 14 was positive, it will continue to conduct, but the potential at the junction 24 will rise above ground, and will therefore back-bias diode 32 and prevent current flowing through the tunnel diode 30. Under these conditions, the output signal will remain at —3 volts, since the tunnel diode 30 will remain in the low voltage region of its operating characteristics.

If the transistor 16 is not conducting when switch 46 is opened by reason of a negative signal on its base terminal 14, then the tunnel diode will conduct through diode 32. The current flowing through the tunnel diode is sufficiently great when it conducts through diode 32 and resistor 26 to cause it to change from the low voltage to the high voltage state. When the diode 30 is in the high voltage state, the base of transistor 40 is sufficiently below ground to cause the transistor 40 to conduct, thereby causing the collector potential to rise from —3 volts to about 0 volts. Thus, the output potential at the output terminal 48 will remain at —3 volts immediately following an interrogate signal if the voltage on the base of transistor 40 is positive with respect to ground and will become 0 if it is negative with respect to ground.

The tunnel diode will always change states from the low voltage to the high voltage condition, unless prevented from doing so by reason of conduction of the transistor 16. In the foregoing discussion, diode voltage drops, when conducting, and transistor voltage drops have generally been neglected, since the input signal can usually be amplified to a level where these voltages are not important. Further, it will be apparent that no lock-out is present to prevent transistor 16 from beginning conduction while switch 46 is open. However, the converter operates so rapidly and the interrogate switch is open for such a short period (approximately 50 nanoseconds) that this problem is not of practical concern. If the interrogate switch is to be open for longer periods, the input signal may be supplied from a sample and hold circuit to insure that it remains constant during the comparator operation.

Following the comparator measurement, the switch 46 is closed and a reset pulse is applied through diode 38 to reset the tunnel diode to its low voltage state.

Thus I have provided a comparator circuit which is simple and economical in construction and therefore particularly adapted for use in high speed analog to digital converters which use the simultaneous method of conversion. It will of course be obvious that while I have illustrated the comparator of my invention with transistors of a specific type and voltage sources of a particular polarity and magnitude, the circuit could be constructed with voltage sources of different types and polarities, using appropriate transistor types and diode polarities.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A comparator circuit for providing at a predetermined time when an interrogation signal is supplied thereto, an output signal which has a first or a second value dependent upon the polarity of the input signal being supplied thereto concurrently with said interrogation signal, said circuit comprising, in combination, means providing a first voltage source, a resistor, one end of said resistor being connected to said first voltage source, the other end of said resistor being connected to a junction point, means for clamping said junction point to a predetermined voltage different from said first voltage source, said clamp being removed when said circuit is interrogated, means forming a first current path between said junction point and a second source of voltage, said first current path including a transistor having a control electrode, means connecting the control electrode of said transistor to the input terminal of said circuit and means supplying a reference signal to said control electrode, said transistor being biased to be non-conducting for one polarity of signal on its control electrode when said junction point is clamped to said predetermined voltage, means forming a second current path between said junction point and a reference voltage, said second current path including a tunnel diode and a second diode connected in series, the current through said tunnel diode being limited prior to interrogation to a value to place said tunnel diode in a first of its two voltage states, conduction through said first current path biasing said second diode in said second current path for non-conduction, means for setting said tunnel diode to said first voltage state, and means responsive to the state of said tunnel diode for providing an output signal.

2. The combination defined in claim 1 in which said means providing an output signal responsive to the state of said tunnel diode includes a transistor, and means connecting the control electrode and one other electrode of said transistor in parallel with said tunnel diode.

3. The combination defined in claim 1 in which said means for setting said tunnel diode to its first voltage state includes means for reverse biasing said tunnel diode.

4. The combination defined in claim 1 in which the predetermined voltage to which said junction point is clamped and the reference voltage associated with said second current path are substantially the same.

5. The combination defined in claim 1 in which said clamping means includes a diode and a switch connected in series between a source of clamping voltage and said junction point, said switch being opened when said circuit is interrogated.

No references cited.

ARTHUR GAUSS, *Primary Examiner.*

R. H. PLOTKIN, *Assistant Examiner.*